United States Patent
Mozurkewich et al.

(10) Patent No.: US 10,464,461 B1
(45) Date of Patent: Nov. 5, 2019

(54) SEAT TRIM INTEGRATED GRAB HANDLES FOR OFF ROAD VEHICLES

(71) Applicant: Ford Global Technologies, LLC, Dearborn, MI (US)

(72) Inventors: Kevin Mozurkewich, Livonia, MI (US); Marcos Silva Kondrad, Macomb Township, MI (US); Kevin Wayne Preuss, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/992,836

(22) Filed: May 30, 2018

(51) Int. Cl.
*B60N 3/02* (2006.01)
*B60N 2/90* (2018.01)

(52) U.S. Cl.
CPC ............. *B60N 3/023* (2013.01); *B60N 2/90* (2018.02); *B60N 3/026* (2013.01)

(58) Field of Classification Search
CPC .... Y10T 16/4554; B60N 3/023; B60N 3/026; B60N 2/90
USPC .................... 297/183.2, 183.9; 296/1.02
See application file for complete search history.

(56) References Cited

U.S. PATENT DOCUMENTS

| | | | | |
|---|---|---|---|---|
| 2,962,138 A * | 11/1960 | Finkelstein | ............. | A45C 13/26 16/405 |
| 2,987,150 A * | 6/1961 | Szabo | ................. | A45C 13/26 16/405 |
| 3,034,617 A * | 5/1962 | Gehrle | ................. | A45C 13/26 16/405 |
| 3,275,336 A * | 9/1966 | Warner, Jr. | ............ | A45C 5/145 16/405 |
| 3,320,995 A * | 5/1967 | Reiter | ................. | A45C 13/26 16/405 X |
| 3,566,436 A * | 3/1971 | Mark et al. | ............ | A45C 13/26 16/405 |
| 4,169,623 A * | 10/1979 | Smith | ................. | B60N 3/023 296/1.02 X |
| 4,431,234 A * | 2/1984 | Lacey | ................. | B60J 5/0487 297/183.9 |
| 5,509,689 A * | 4/1996 | Lin | ..................... | A63C 17/00 16/405 |
| 6,109,200 A * | 8/2000 | Rieger | ................ | B63B 17/04 297/183.2 X |
| 7,712,590 B1 * | 5/2010 | Lee | ..................... | A45C 13/26 16/110.1 |
| 7,775,573 B2 * | 8/2010 | Lipke | ................. | B60N 3/026 296/1.02 |

(Continued)

*Primary Examiner* — Rodney B White
(74) *Attorney, Agent, or Firm* — Vichit Chea; Price Heneveld LLP

(57) ABSTRACT

A vehicle seating assembly includes a frame and a seat that includes a cushion and a cushion cover. The seat defines a handle slot. A retractable handle is disposed in the handle slot and is operable between a retracted position and a deployed position. The retractable handle includes an elongate flexible body having first and second ends fixedly coupled with the frame, and first and second stretchable members operably coupled with the first and second ends, respectively, and configured to draw down a portion of the elongate flexible body. A graspable webbing is disposed between the first and second stretchable members, wherein the graspable webbing is configured to be grabbed by a user and drawn away from the frame which stretches the first and second stretchable members.

16 Claims, 8 Drawing Sheets

(56) References Cited

U.S. PATENT DOCUMENTS

| | | | |
|---|---|---|---|
| 8,641,117 B2* | 2/2014 | Abe | B60N 3/023 |
| | | | 296/1.02 |
| 10,196,002 B1* | 2/2019 | del Puerto | B60N 2/62 |
| 2001/0011836 A1* | 8/2001 | Grey | B60N 2/002 |
| | | | 296/214 |
| 2003/0062759 A1 | 4/2003 | Gupta et al. | |
| 2004/0036305 A1* | 2/2004 | Smith | B60N 3/023 |
| | | | 296/1.02 |
| 2008/0174145 A1* | 7/2008 | Saionji | B60N 3/023 |
| | | | 296/146.1 |
| 2008/0217941 A1* | 9/2008 | Chernoff | B60N 3/023 |
| | | | 296/1.02 |
| 2010/0115809 A1* | 5/2010 | Pacheco | B60N 3/023 |
| | | | 40/318 |
| 2010/0194154 A1 | 8/2010 | Hicks et al. | |
| 2011/0247909 A1* | 10/2011 | Scicluna | A45C 13/28 |
| | | | 190/115 |
| 2013/0319785 A1 | 12/2013 | Spindler et al. | |
| 2014/0292044 A1* | 10/2014 | Uchiyama | B60N 2/01 |
| | | | 297/183.9 |
| 2015/0210220 A1* | 7/2015 | Ross | B60R 7/10 |
| | | | 296/1.02 |
| 2016/0075265 A1* | 3/2016 | Claire | B60N 3/02 |
| | | | 296/1.02 |
| 2016/0200233 A1* | 7/2016 | Guzman | B60N 3/026 |
| | | | 296/1.02 |
| 2017/0101043 A1* | 4/2017 | Lee | B60N 3/023 |

* cited by examiner

SEAT TRIM INTEGRATED GRAB HANDLES FOR OFF ROAD VEHICLES

FIELD OF THE DISCLOSURE

The present disclosure generally relates to grab handles positioned inside a vehicle, and more specifically, to seat trim integrated grab handles for off road vehicles.

BACKGROUND OF THE DISCLOSURE

Traditional grab handles are positioned within a vehicle and are typically secured to the frame in places that are easy for a passenger or driver to grab. Unfortunately, the grab handles are often bulky and take up interior space within the cabin of the vehicle. The proposed constructions as set forth herein require minimal cabin space, yet provide a sturdy and reliable grab handle that can be grasped during travel over rough terrain.

SUMMARY OF THE DISCLOSURE

According to one aspect of the present disclosure, a vehicle seating assembly includes a frame and a seat that includes a cushion and a cushion cover. The seat defines a handle slot. A retractable handle is disposed in the handle slot and is operable between a retracted position and a deployed position. The retractable handle includes an elongate flexible body having first and second ends fixedly coupled with the frame, and first and second stretchable members operably coupled with the first and second ends, respectively, and configured to draw down a portion of the elongate flexible body. A graspable webbing is disposed between the first and second stretchable members, wherein the graspable webbing is configured to be grabbed by a user and drawn away from the frame which stretches the first and second stretchable members.

Embodiments of the first aspect of the disclosure can include any one or a combination of the following features:
  the first and second stretchable members are comprised of an elastic material;
  the first and second ends limit the distance of stretch of the first and second stretchable members;
  the first and second stretchable members include a stretchable member segment that is fixedly attached to a flexible body segment and wherein the flexible body segment includes a length greater than the stretchable member segment when in an unstretched condition;
  the first and second ends are riveted to the frame;
  the handle slot is a pocket defined in a coverstock of the seat; and
  the webbing and coverstock are constructed from the same material.

According to another aspect of the present disclosure, a seating assembly includes a retractable handle disposed in a handle slot of a seat. The retractable handle includes an elongate flexible body having first and second ends fixedly coupled with a seat frame and first and second stretchable members operably coupled with the first and second ends, respectively, and configured to draw down the elongate flexible body portion. A graspable webbing is disposed between the first and second stretchable members.

Embodiments of the second aspect of the disclosure can include any one or a combination of the following features:
  the first and second stretchable members are an elastic material;
  the first and second ends limit the distance of stretch of the first and second stretchable members;
  the first and second stretchable members include at least one stretchable member segment that is fixedly attached to a flexible body segment and wherein the flexible body segment includes a length greater than the stretchable member segment when in an unstretched condition;
  the first and second ends are riveted to the frame;
  the handle slot is a pocket defined in a coverstock of the seat; and
  the webbing and coverstock are constructed from the same material.

According to yet another aspect of the present disclosure, a seating assembly includes one of a seatback and a seat defining a handle slot and a retractable handle disposed in the handle slot. The retractable handle includes an elongate flexible body having first and second ends fixedly coupled with a seat frame and first and second stretchable members operably coupled with the first and second ends, respectively. A webbing is disposed between the first and second stretchable members, the webbing configured to be drawn away from the frame by a user which stretches the first and second stretchable members until the elongate flexible body is taut and the retractable handle is in a deployed position.

Embodiments of the third aspect of the disclosure can include any one or a combination of the following features:
  the retractable handle is disposed between adjacent seats;
  the first and second ends are fixedly coupled directly to the frame;
  the handle slot is a pocket defined in a coverstock of the seat; and
  the webbing and coverstock are constructed from the same material.

These and other aspects, objects, and features of the present disclosure will be understood and appreciated by those skilled in the art upon studying the following specification, claims, and appended drawings.

DETAILED DESCRIPTION

Figure 1:
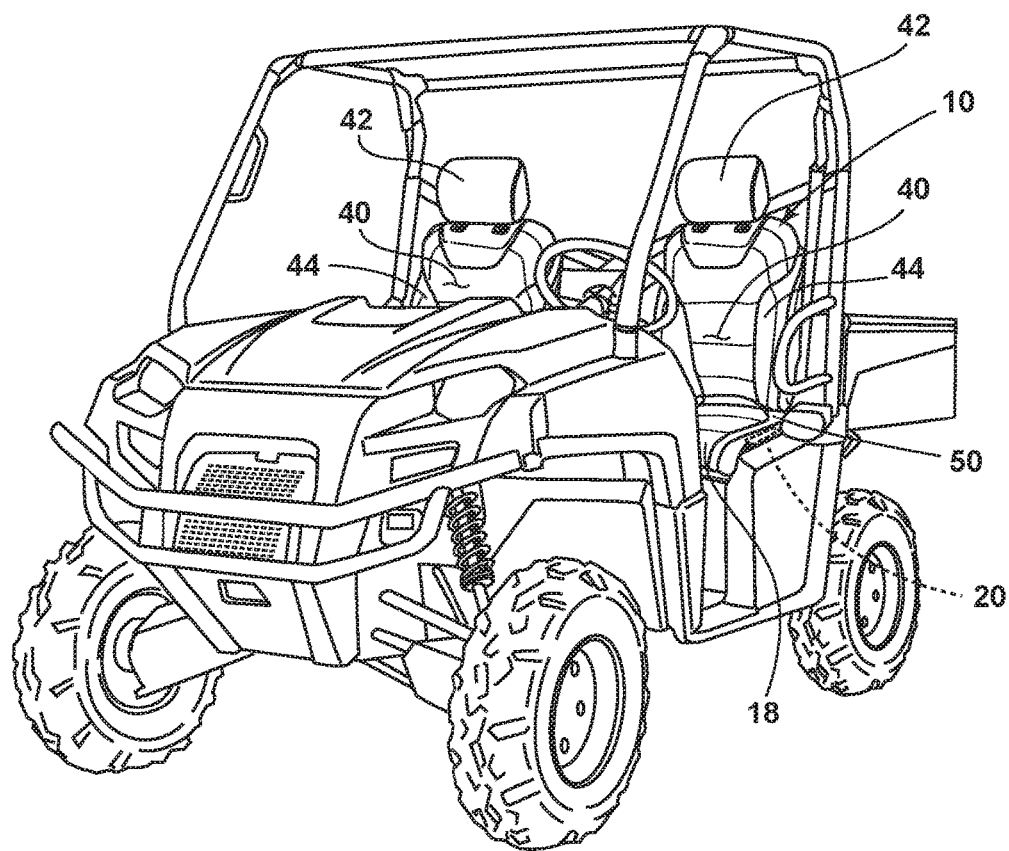
FIG. 1 is a top perspective view of a vehicle incorporating a vehicle seating assembly having a retractable handle of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 2:
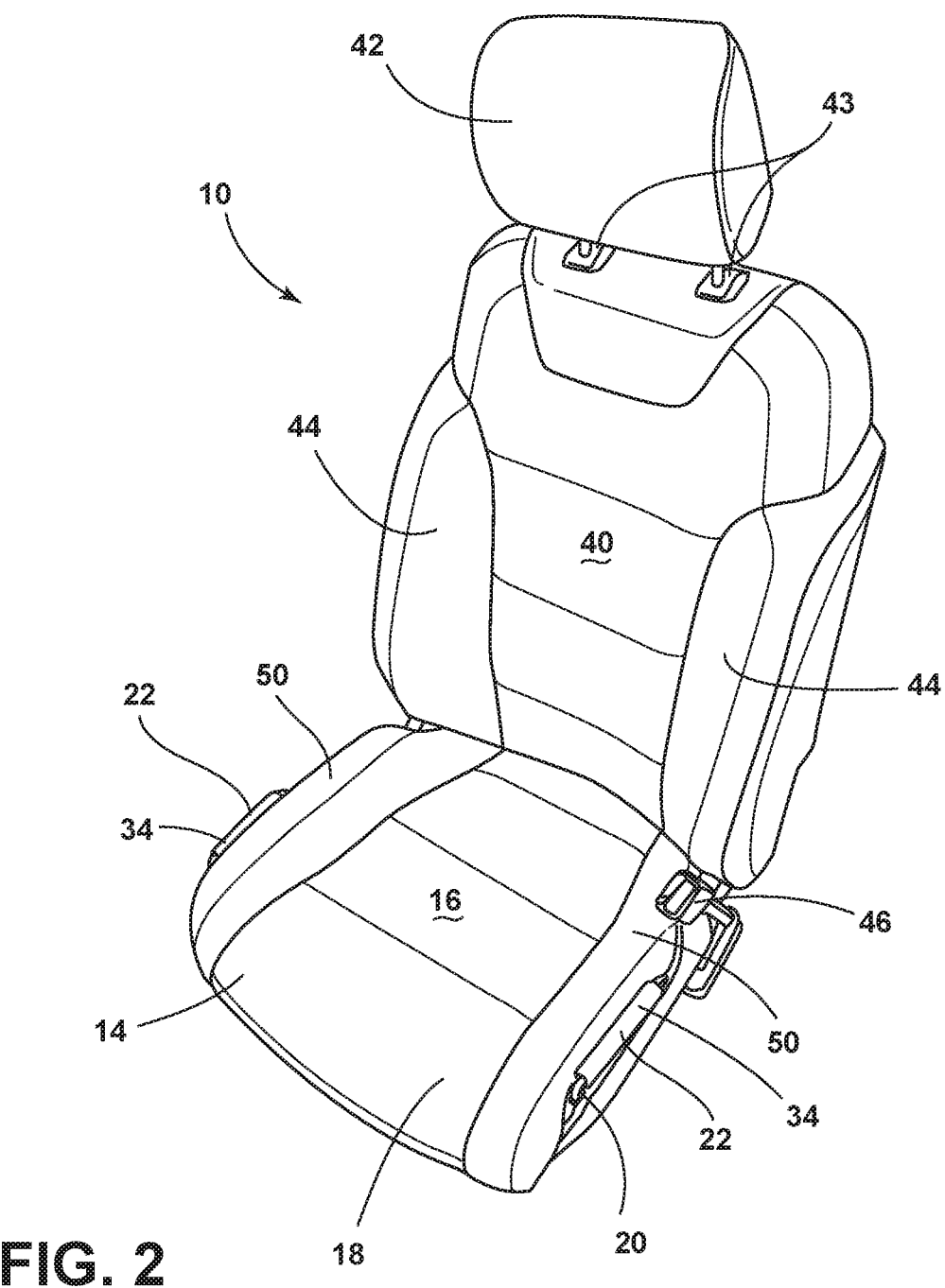
FIG. 2 is a top perspective view of a vehicle seating assembly of the present disclosure.

With reference to FIG. 1, a vehicle seating assembly 10 includes a frame 12 and a seat 14 that includes a cushion 16 and a cushion cover 18 (FIG. 2). The seat 14 defines a handle slot 20. A retractable handle 22 is disposed in the handle slot 20 and is operable between a retracted position and a deployed position. The retractable handle 22 includes an elongate flexible body 24 having first and second ends 26, 28 fixedly coupled with the frame 12, and first and second stretchable members 30, 32 operably coupled with the first and second ends 26, 28, respectively, and configured to draw down a portion of the elongate flexible body 24. A graspable webbing 34 is disposed between the first and second stretchable members 30, 32, wherein the graspable webbing 34 is configured to be grabbed by a user and drawn away from the frame 12 which stretches the first and second stretchable members 30, 32.

With reference again to FIG. 1, the vehicle seating assembly 10 generally includes a seatback 40 operably coupled with the seat 14. The seatback 40 also includes a headrest 42 configured for adjustment relative to the seatback 40. The headrest 42 may be adjustable on headrest extensions 43. The seatback 40 includes seatback side bolsters 44 configured to fit against the sides of a seated user. Like the seatback 40, the seat 14 includes seat side bolsters 50 that help secure a passenger on the seat 14. In addition, the seatback 40 or the seat 14 may include a seat harness, or seatbelt 46, configured to secure a passenger against the vehicle seating assembly 10 for safety purposes. It will be understood that the vehicle seating assembly 10 may include other features, such as rail slides and automatic or manual adjustments so that the vehicle seating assembly 10 can accommodate users of different sizes and shapes.

Figure 3:
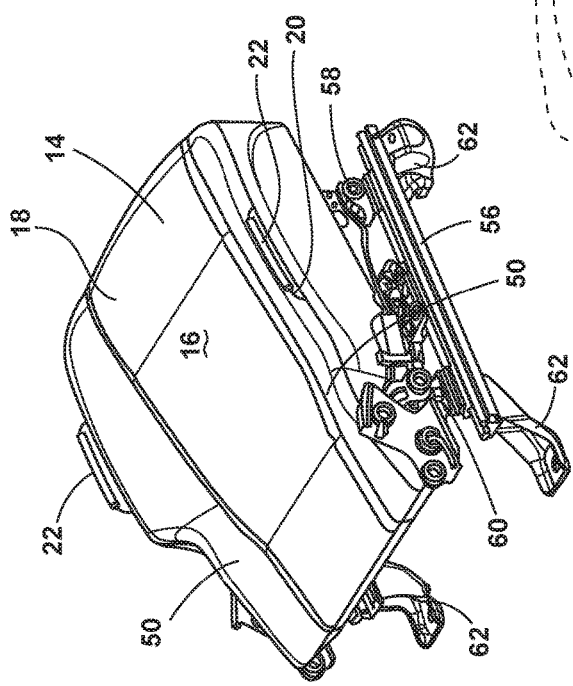
FIG. 3 is a top rear perspective view of a seat of the present disclosure.
Figure 4:
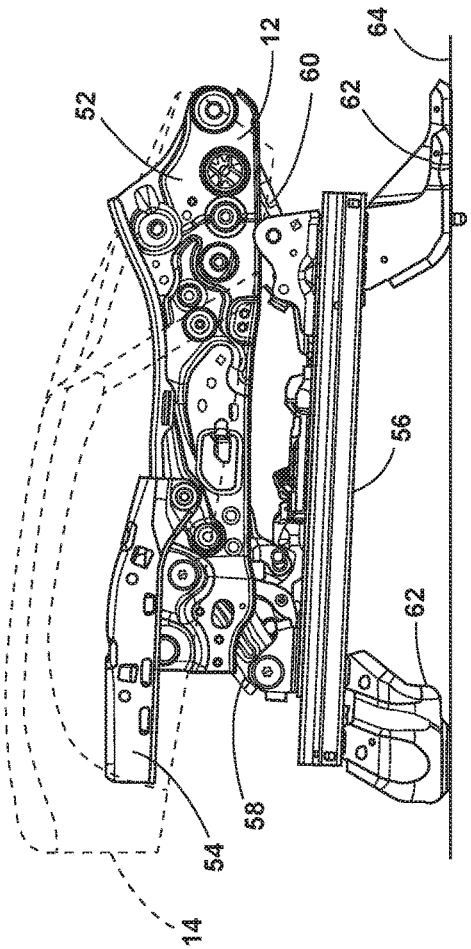
FIG. 4 is a side elevation view of a seat of the present disclosure.

With reference now to FIGS. 3 and 4, the retractable handles 22 are configured for secure engagement with side members 52 of the frame 12. The side members 52 are configured to support the cushion 16 and cushion cover 18 of the seat 14. The side members 52 also include a front seat pan 54 that may be rotatably adjustably connected with the side members 52. The side members 52 are operably coupled with a rail slide 56 by forward and rearward support columns 58, 60, positioned at front and rear portions of the side members 52, respectively. The rail slide 56 includes feet 62 that are operably coupled with a floor 64 or frame of the vehicle. It will be understood that the retractable handle 22 may be positioned adjacent the cushion 16 of the seat 14 or disposed in the handle slot 20 adjacent the seat 14.

Figure 5:
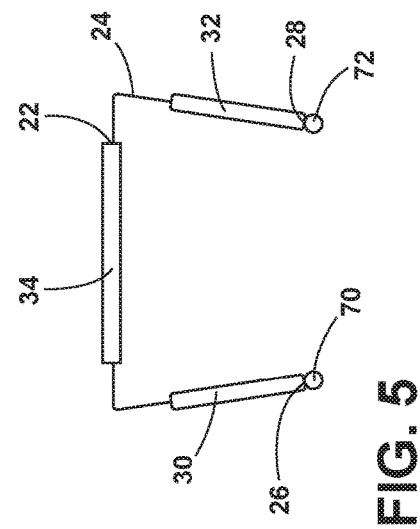
FIG. 5 is a schematic view of a retractable handle of the present disclosure.

With reference now to FIG. 5, the retractable handle 22 is shown in a schematic format. The retractable handle 22 may include fasteners, such as forward and rearward rivets 70, 72, that operably couple the first and second ends 26, 28 of the elongate flexible body 24 of the retractable handle 22 to the side members 52 of the frame 12. The first and second stretchable members 30, 32 may also be coupled with the frame 12 at each of the forward and rearward rivets 70, 72. The first and second stretchable members 30, 32 are operably coupled with the elongate flexible body 24 to draw down the elongate flexible body 24. Each of the first and second stretchable members 30, 32 may be disposed at the first and second ends 26, 28 or any intermediate position. Specifically, the first stretchable member 30 may be disposed at the first end 26, of the webbing 34, or anywhere between the first end 26 and the webbing 34. Similarly, the second stretchable member 32 may be disposed at the second end 28, at the webbing 34, or anywhere between the second end 28 and the webbing 34. The first and second stretchable members 30, 32 draw down a portion of the elongate flexible body 24 when not in use. When in use, a user can grasp the elongate flexible body 24 and draw the elongate flexible body 24 away from the forward and rearward rivets 70, 72 against the elastic force of the first and second stretchable members 30, 32. While forward and rearward rivets 70, 72 are included as an exemplary fastener, other fasteners may be used. Such fasteners can include, but are not limited to, screws, bolts, pins, latches, hasps, clasps, welds, adhesives, combinations thereof and other similar fastening mechanisms and methods.

Figure 7:
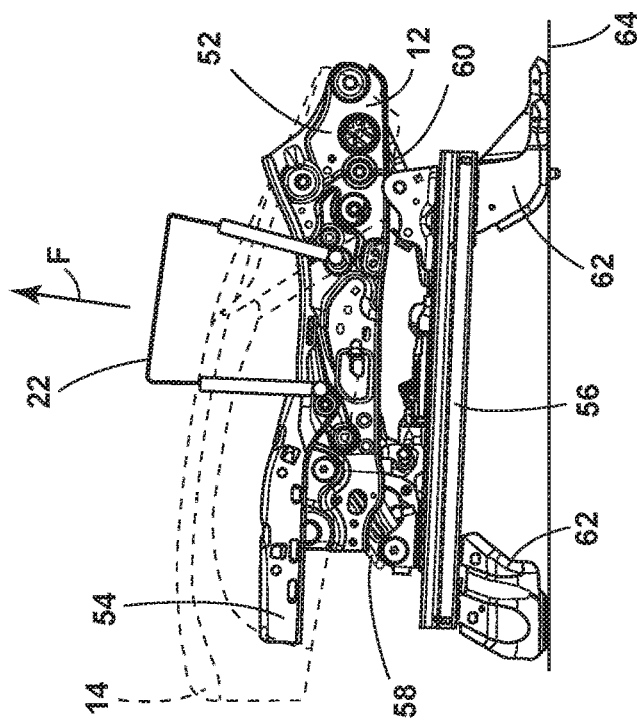
FIG. 7 is a side elevational view of a retractable handle of the present disclosure in an extended position.
Figure 6:
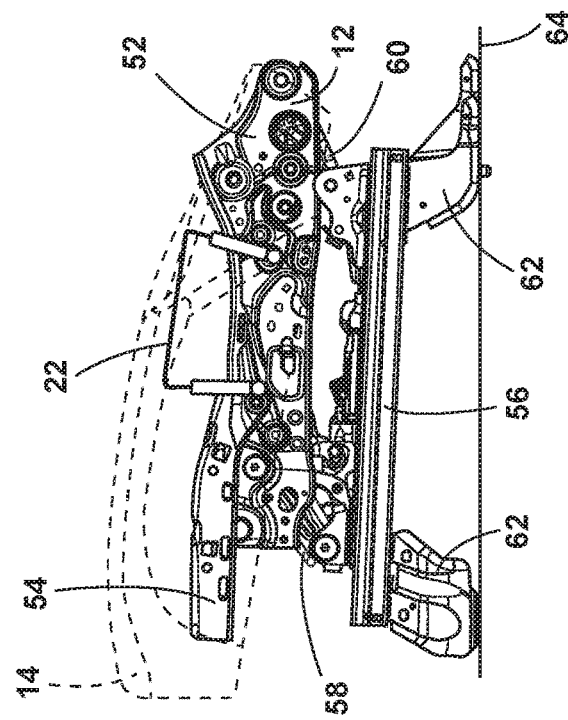
FIG. 6 is a side elevational view of retractable handle of the present disclosure in a retracted position.

With reference now to FIGS. 6 and 7, the retractable handle 22 is illustrated secured with the side members 52 of the frame 12. FIG. 6 illustrates the retractable handle 22 in the retracted position, while FIG. 7 illustrates the retractable handle 22 in the deployed position. Notably, for the retractable handle 22 to enter the deployed position, an upward force (F), likely by the hand of a user, is applied to the retractable handle 22. When the upward force (F) is removed, the first and second stretchable members 30, 32 draw the webbing 34 back toward the fame 12.

Figure 9:
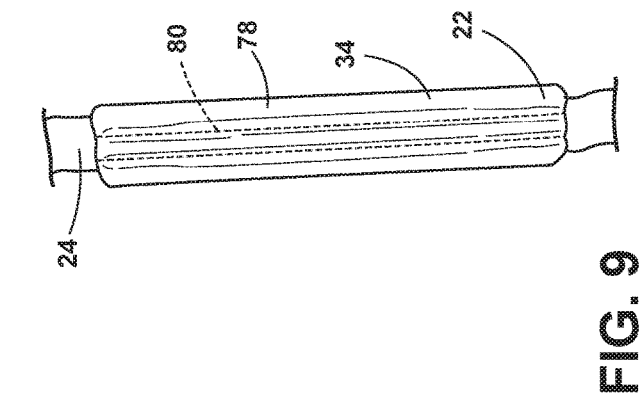
FIG. 9 is a partial top plan view of a graspable webbing of a handle of the present disclosure.
Figure 10:
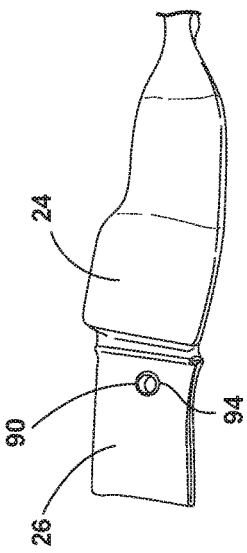
FIG. 10 is a top perspective view of an end of flexible body of a handle of the present disclosure.
Figure 8:
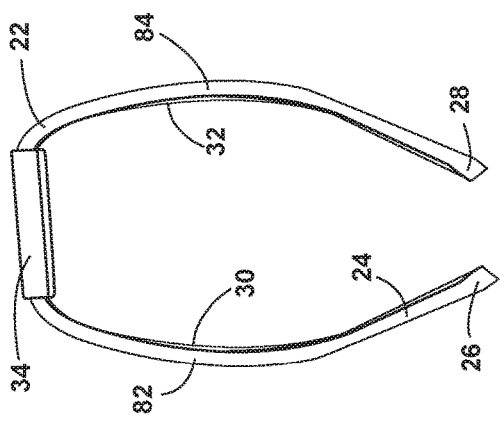
FIG. 8 is a side elevational view of a retractable handle in an extended position.
Figure 8A:
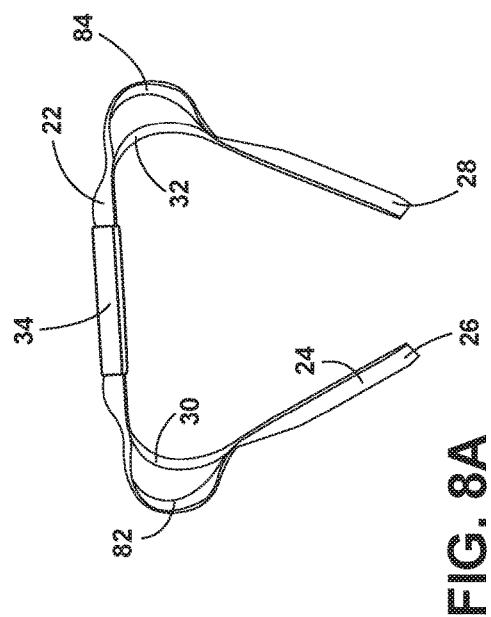
FIG. 8A is the retractable handle of FIG. 8 in a retracted position.

With reference now to FIGS. 8-10, one example of a retractable handle 22 is illustrated. In the illustrated embodiment, the graspable webbing 34 of the elongate flexible body 24 includes a tactile or frictional grasping portion 78. The grasping portion 78 may be comprised of a frictional material that is easily graspable and comfortable to grasp by a user. The first and second stretchable members 30, 32 are disposed inside and operably coupled with sections of the elongate flexible body 24. The graspable webbing 34 is disposed proximate the first and second stretchable members 30, 32. The webbing 34 may be secured to the elongate flexible body 24 by stitching 80, adhesive, etc. The graspable webbing 34 is configured to be grabbed by a user and drawn away from the frame, thereby stretching the first and second stretchable members 30, 32. Notably, the first and second stretchable members 30, 32 have a length that is less than proximal portions 82, 84 of the elongate flexible body 24 when the retractable handle 22 is in the retracted position. The proximal portions 82, 84 are adjacent the first and second stretchable members 30, 32. When the retractable handle 22 has moved to the deployed position, the first and second stretchable members 30, 32 have a length that is approximately equal to the proximal portions 82, 84 of the elongate flexible body 24 (FIG. 8A).

As shown in FIG. 10, each of the first and second ends 26, 26 may include an aperture 90 for receiving one rivet 70 or 72, or other fastener, that secures the first and second ends 26, 28 of the elongate flexible body 24 to the side frame members. The aperture 90 may include a reinforcing ring 94 configured to securely engage the rivet 70 or 72. Alternatively, the first and second ends 26, 28 may be secured with the frame 12 by adhesives, stitching, mechanical fasteners, etc.

Figure 12:
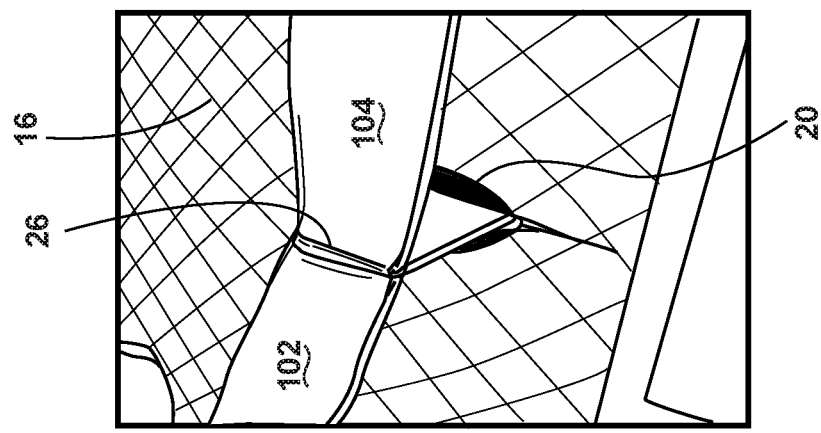
FIG. 12 is a bottom perspective view of a handle slot extending through a seat of the present disclosure.
Figure 11:
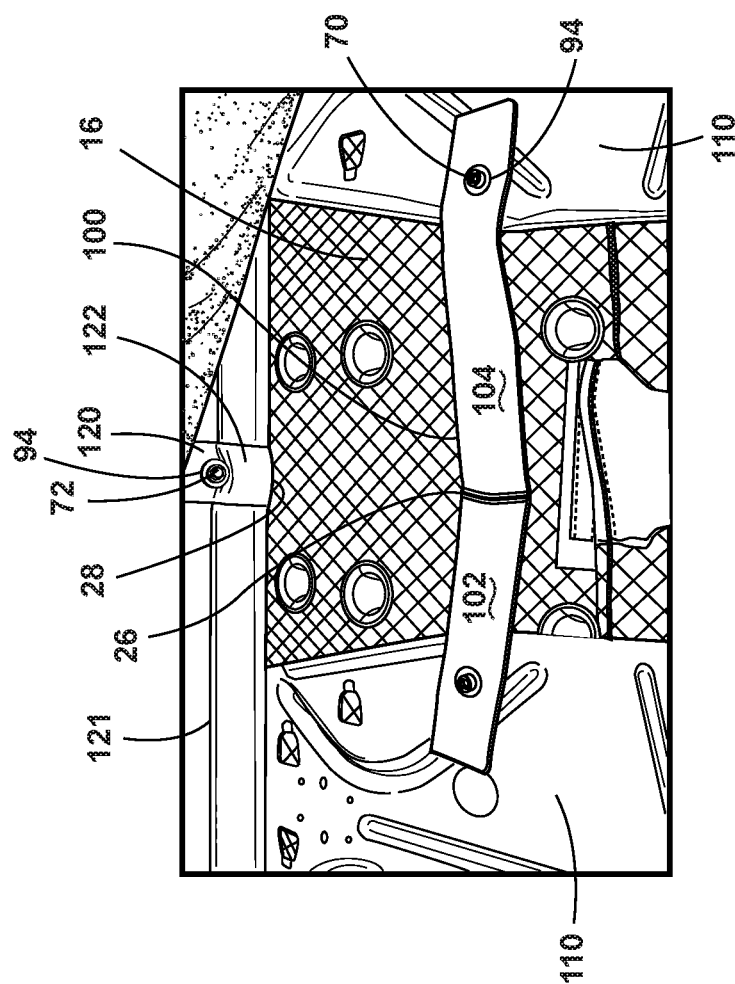
FIG. 11 is a bottom perspective view of an underside of a seating assembly operably coupled with a portion of a retractable handle of the present disclosure.

With reference now to FIGS. 11 and 12, it will be understood that the retractable handle 22 may be generally retracted and concealed from view when not in use. Alternatively, the retractable handle 22 may be concealable when not in use by simply pushing the retractable handle 22 into a cavity defined between adjacent cushions in a vehicle. FIG. 11 shows the underside of a seating structure. As shown in FIG. 11, either of the first and second ends 26, 28 of the elongate flexible body 24 may include a connection member 100 that extends between adjacent structural surfaces 110 below the seat and which has first and second branches 102, 104. The structural surfaces 110 may be configured to receive rivets 70, 72 that secure the connecting ends to the structural surfaces 110. The elongate flexible body 24 is fed through a handle slot 20 through the foam cushion 16 of vehicle seating assembly 10. The other of the first and second ends 26, 28 may be secured at a rear attachment point 120 operably coupled with a tubular frame 121 at a back portion of the vehicle seating assembly 10 by a looped portion 122 and one or more rivets 72. As a result, the retractable handle 22 is securely tied to structural support surfaces of the vehicle.

Figure 13:
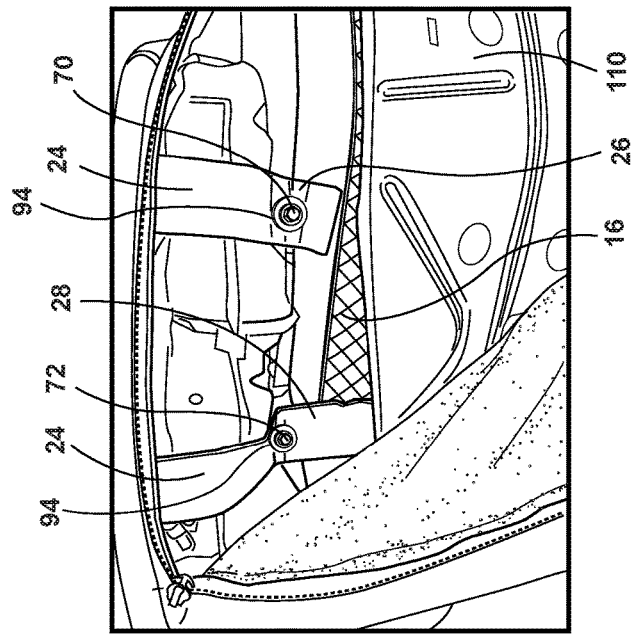
FIG. 13 is a bottom side perspective view of a portion of a seat operably coupled with a handle of the present disclosure.

As shown in FIG. 13, side portions of a vehicle seating assembly 10 may also be operably coupled with first and second ends 26, 28 of first and second stretchable members 30, 32. In this instance, because the retractable handle 22 is disposed on a side of the seat rather than between two adjacent seats, the first and second ends 26, 28 are coupled with a single frame member.

With reference again to FIG. 13, the first and second ends 26, 28 may be coupled with a side of the seating assembly 10. In addition, access to the rivets 70, 72 and first and second ends 26, 28 may be obtained by unzipping a portion of the seat 14 to expose these features. This capability facilitates ease of repair or replacement.

Figure 14:
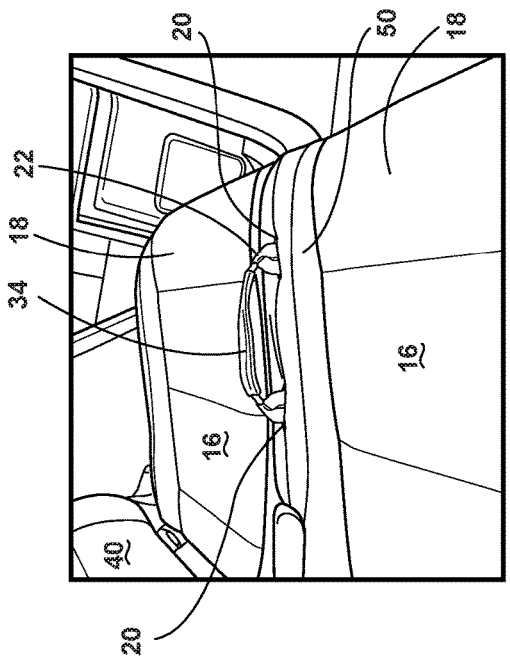
FIG. 14 is a top perspective view of a handle of the present disclosure disposed between adjacent vehicle seating assemblies.
Figure 15:
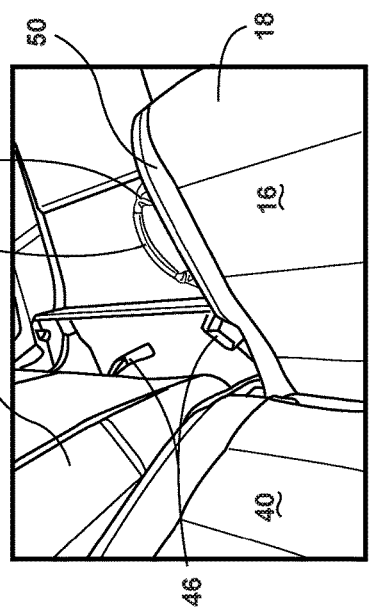
FIG. 15 is a retractable handle of the present disclosure disposed adjacent to a seat that is in a downward position and a seat that is in a vertical upraised position.

With reference to FIGS. 14 and 15, the retractable handle 22 may be operably coupled to the frame 12 in such a way that the cushion 16 of the seat 14 may be removed or rotated upwardly (FIG. 15) and still provide access of the retractable handle 22 to a user. The retractable handle 22 may be adjacent the cushion 16 or extend through a handle slot 20 defined through the cushion 16.

Figure 16:
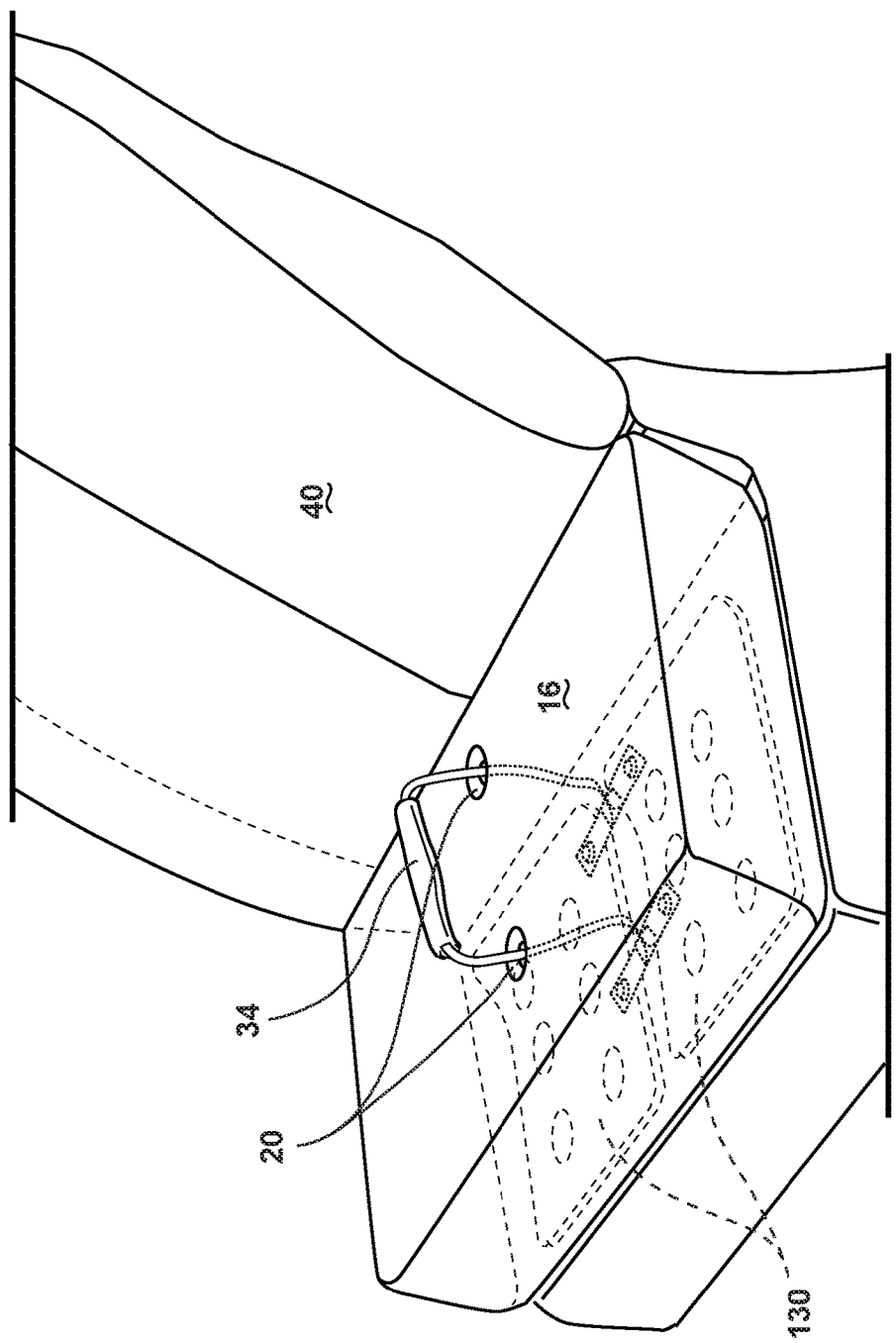
FIG. 16 is a top schematic view of another vehicle seating assembly of the present disclosure incorporating a retractable handle.

With reference now to FIG. 16, in another embodiment, handles tied to first and second structural members 130 disposed below a seat 14 of the vehicle seating assembly 10. Handle slots 20 are defined through a central portion of the cushion 16 and allow transition of the elongate flexible body 24 through the cushion to the handle 22.

The retractable handles 22 as set forth herein provide easily graspable handles to accommodate passengers and which can easily be stored out of the way and hidden. The handles 22 are coupled with the frame and includes strong yet flexible body and stretchable members that counteract the graspable webbing.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly comprising:
   a frame;
   a seat that includes a cushion and a cushion cover, the seat defining a handle slot, wherein the handle slot is a pocket defined in a coverstock of the seat;
   a retractable handle disposed in the handle slot and operable between a retracted position and a deployed position, the retractable handle comprising:
      an elongate flexible body having first and second ends fixedly coupled with the frame;
      first and second stretchable members operably coupled with the first and second ends, respectively, and configured to draw down a portion of the elongate flexible body; and
      a graspable webbing disposed between the first and second stretchable members, wherein the graspable webbing is configured to be grabbed by a user and drawn away from the frame which stretches the first and second stretchable members.

2. The vehicle seating assembly of claim 1, wherein the first and second stretchable members are comprised of an elastic material.

3. The vehicle seating assembly of claim 1, wherein the first and second ends limit the distance of stretch of the first and second stretchable members.

4. The vehicle seating assembly of claim 1, wherein the first and second stretchable members include a stretchable member segment that is fixedly attached to a flexible body segment and wherein the flexible body segment includes a length greater than the stretchable member segment when in an unstretched condition.

5. The vehicle seating assembly of claim 1, wherein the first and second ends are fastened to the frame.

6. The vehicle seating assembly of claim 1, wherein the graspable webbing and coverstock are constructed from the same material.

7. A seating assembly comprising:
   a retractable handle disposed in a handle slot of a seat, wherein the handle slot is a pocket defined in a coverstock of the seat, the retractable handle comprising:
      an elongate flexible body having first and second ends fixedly coupled with a seat frame;
      first and second stretchable members operably coupled with the first and second ends, respectively, and configured to draw down the elongate flexible body portion; and
      a graspable webbing disposed between the first and second stretchable members.

8. The seating assembly of claim 7 wherein the first and second stretchable members are an elastic material.

9. The seating assembly of claim 7 wherein the first and second ends limit the distance of stretch of the first and second stretchable members.

10. The seating assembly of claim 7 wherein the first and second stretchable members include at least one stretchable member segment that is fixedly attached to a flexible body segment and wherein the flexible body segment includes a length greater than the stretchable member segment when in an unstretched condition.

11. The seating assembly of claim 7 wherein the first and second ends are riveted to the frame.

12. The seating assembly of claim 7 wherein the graspable webbing and coverstock are constructed from the same material.

13. A seating assembly comprising:
   one of a seatback and a seat defining a handle slot, wherein the handle slot is a pocket defined in a coverstock of the seat;
   a retractable handle disposed in the handle slot and comprising:
      an elongate flexible body having first and second ends fixedly coupled with a seat frame;
      first and second stretchable members operably coupled with the first and second ends, respectively; and
      a webbing disposed between the first and second stretchable members, the webbing configured to be drawn away from the frame by a user which stretches the first and second stretchable members until the elongate flexible body is taut and the retractable handle is in a deployed position.

14. The seating assembly of claim 13 wherein the retractable handle is disposed between adjacent seats.

15. The seating assembly of claim 13 wherein the first and second ends are fixedly coupled directly to the frame.

16. The seating assembly of claim 13 wherein the webbing and coverstock are constructed from the same material.

* * * * *